US011763694B2

(12) United States Patent
Urano et al.

(10) Patent No.: US 11,763,694 B2
(45) Date of Patent: Sep. 19, 2023

(54) SYSTEMS AND METHODS FOR TRAINING A DRIVER ABOUT AUTOMATED DRIVING OPERATION USING A RELIABILITY MODEL

(71) Applicant: Toyota Research Institute, Inc., Los Altos, CA (US)

(72) Inventors: Hiromitsu Urano, Numazu (JP);
Kentaro Ichikawa, Sunto-gun (JP);
Junya Ueno, Susono (JP)

(73) Assignee: Toyota Research Institute, Inc., Los Altos, CA (US)

( * ) Notice: Subject to any disclaimer, the term of this patent is extended or adjusted under 35 U.S.C. 154(b) by 473 days.

(21) Appl. No.: 16/935,486

(22) Filed: Jul. 22, 2020

(65) Prior Publication Data

US 2022/0028293 A1 Jan. 27, 2022

(51) Int. Cl.
| | |
|---|---|
| *G09B 9/052* | (2006.01) |
| *G09B 9/042* | (2006.01) |
| *G09B 19/16* | (2006.01) |
| *B60W 60/00* | (2020.01) |
| *B60W 50/14* | (2020.01) |
| *G06V 20/58* | (2022.01) |

(52) U.S. Cl.
CPC ............. *G09B 9/052* (2013.01); *B60W 50/14* (2013.01); *B60W 60/0054* (2020.02); *B60W 60/0057* (2020.02); *G06V 20/58* (2022.01); *G09B 9/042* (2013.01); *G09B 19/167* (2013.01)

(58) Field of Classification Search
CPC ...... G09B 9/052; G09B 9/042; G09B 19/167; B60W 60/0057; B60W 60/0054; B60W 50/14; G06V 20/58
See application file for complete search history.

(56) References Cited

U.S. PATENT DOCUMENTS

| | | |
|---|---|---|
| 6,604,035 B1 | 8/2003 | Wetzel et al. |
| 8,483,909 B2 | 7/2013 | Visconti et al. |
| 8,838,371 B2 | 9/2014 | Sakai et al. |

(Continued)

FOREIGN PATENT DOCUMENTS

JP    6654907 B2    2/2020

OTHER PUBLICATIONS

Carolyn Said, "Self-Driving Cars See Less Human Intervention in California," San Francisco Chronicle, Feb. 14, 2019, pp. 1-2.

*Primary Examiner* — Jay Trent Liddle
*Assistant Examiner* — Alyssa N Brandley
(74) *Attorney, Agent, or Firm* — Christopher G. Darrow; Darrow Mustafa PC (57) ABSTRACT

System, methods, and other embodiments described herein relate to improving the training of a driver during an automated driving system mode. In one embodiment, a method includes generating, in association with a maneuver by the driver that is a takeover of a vehicle, an automated motion plan associated with the maneuver. The method also includes determining if the automated motion plan is valid based, at least in part, on a condition that one or more parameters of a reliability model satisfy a threshold. The one or more parameters may be associated with the vehicle and a driving environment. The method also includes notifying the driver that the maneuver was unnecessary using a notification signal if the one or more parameters satisfy the threshold.

20 Claims, 5 Drawing Sheets

(56) References Cited

U.S. PATENT DOCUMENTS

| | | | |
|---|---|---|---|
| 9,873,427 B2 | 1/2018 | Danzl et al. | |
| 10,496,090 B2 | 12/2019 | Latotzki et al. | |
| 10,571,911 B2 | 2/2020 | Prokhorov | |
| 2013/0211656 A1* | 8/2013 | An | B62D 15/027 |
| | | | 701/25 |
| 2015/0044641 A1* | 2/2015 | Chauncey | B60W 50/14 |
| | | | 434/66 |
| 2016/0214483 A1* | 7/2016 | Kleen | B60W 50/14 |
| 2017/0061826 A1 | 3/2017 | Jain et al. | |
| 2017/0261984 A1 | 9/2017 | Ichikawa et al. | |
| 2018/0018895 A1* | 1/2018 | Chan | G05D 1/0055 |
| 2018/0067486 A1 | 3/2018 | Yako et al. | |
| 2019/0011917 A1* | 1/2019 | Kuffner, Jr. | G01C 21/26 |
| 2019/0300014 A1 | 10/2019 | Nagase et al. | |
| 2019/0337532 A1* | 11/2019 | Myers | B60W 60/0025 |
| 2020/0409362 A1* | 12/2020 | Long | B60W 50/14 |
| 2021/0197831 A1* | 7/2021 | Choi | G07C 5/0808 |

* cited by examiner

SYSTEMS AND METHODS FOR TRAINING A DRIVER ABOUT AUTOMATED DRIVING OPERATION USING A RELIABILITY MODEL

TECHNICAL FIELD

The subject matter described herein relates, in general, to automated driving systems (ADSs), and, more particularly, to training a driver about ADS operation associated with a reliability model.

BACKGROUND

Vehicles may be equipped with autonomous driving modules for automated driving as part of an automated driving system (ADS). A driver may need training to learn about the capabilities, reliability, and limits of automated driving mode for a particular vehicle. A driver accustomed to level 1 or 2 automated driving may also need training for higher-level modes of automated driving. Also, an experienced driver may need re-training after becoming too comfortable with a vehicle that provides autonomous driving controls. Training a driver about ADS operation may be provided through a vehicle manual, a driving school, a vehicle tutorial in parked mode, training in a special driving facility, a virtual training system, using special vehicle equipment, an interactive website, or the like. Training through these methods is time-intensive, inconvenient, or ineffective at comprehensively training a driver of various experience levels. Moreover, training a driver of certain automated driving capabilities and limits may be difficult outside of the actual driving environment.

A vehicle driving in ADS mode may be taken over by a driver to perform a maneuver because of perceived dissatisfaction, disaffection, lack of safety, or the like with ADS mode operation. The driver may be unaware of ADS reliability, ADS capabilities, ADS improvements, ADS updates, ADS safety features, or the like due to lack of training. Therefore, the driver may unnecessarily takeover control of a vehicle operating in ADS mode resulting in reduced performance, inefficient manual mode operation, reduced safety, or the like. Current solutions to train a driver through a manual, a virtual training system, an interactive website, or the like of ADS improvements, updates, safety features, or reliability may be ineffective at preventing unnecessary takeover.

SUMMARY

In one embodiment, example systems and methods relate to a manner of improving the training of a driver about vehicle takeovers according to a reliability model associated with a vehicle operating in automated driving system (ADS) mode. Comprehensively training a driver about ADS reliability and capabilities may be time-consuming or ineffective when undertaken with the approaches noted above. The vehicle takeover by the driver from ADS operation on roads may be unnecessary if an autonomous driving module(s) could have controlled the vehicle at least as well as the driver for a driving maneuver. Therefore, an improved approach to driver training is disclosed where in association with a maneuver by the driver to take over control of the vehicle, a training system generates an automated motion plan associated with the maneuver to determine if the takeover was unnecessary. In particular, the training system, in one or more arrangements, determines if the automated motion plan is valid and the vehicle takeover was unnecessary according to a reliability model satisfying a threshold. The training system may derive the reliability model from measured parameters associated with the vehicle, a driver, or physical driving factors that are used to verify the automated motion plan. In one or more approaches, the driver is subsequently notified by the training system to educate the driver of the ADS reliability. In this way, the driver learns of the necessity of vehicle takeovers to improve confidence, trust, and understanding of ADS operation for more reliable automated driving.

In one embodiment, a training system for improving the training of a driver during an automated driving system mode is disclosed. The training system includes one or more processors and a memory communicably coupled to the one or more processors. The memory stores a tracking module including instructions that when executed by the one or more processors cause the one or more processors to generate, in association with a maneuver by the driver that is a takeover of a vehicle, an automated motion plan associated with the maneuver. The memory also stores a determination module including instructions that when executed by the one or more processors cause the one or more processors to determine if the automated motion plan is valid based, at least in part, on a condition that one or more parameters of a reliability model satisfy a threshold, wherein the one or more parameters are associated with the vehicle and a driving environment. The determination module also notifies the driver that the maneuver was unnecessary using a notification signal, if the one or more parameters satisfy the threshold.

In one embodiment, a non-transitory computer-readable medium for improving the training of a driver during an automated driving system mode and including instructions that when executed by one or more processors cause the one or more processors to perform one or more functions is disclosed. The instructions include instructions to generate, in association with a maneuver by the driver that is a takeover of a vehicle, an automated motion plan associated with the maneuver. The instructions also include instructions to determine if the automated motion plan is valid based, at least in part, on a condition that one or more parameters of a reliability model satisfy a threshold, wherein the one or more parameters are associated with the vehicle and a driving environment. The instructions also include instructions to notify the driver that the maneuver was unnecessary using a notification signal if the one or more parameters satisfy the threshold.

In one embodiment, a method for improving the training of a driver during an automated driving system mode is disclosed. In one embodiment, the method includes generating, in association with a maneuver by the driver that is a takeover of a vehicle, an automated motion plan associated with the maneuver. The method also includes determining if the automated motion plan is valid based, at least in part, on a condition that one or more parameters of a reliability model satisfy a threshold, wherein the one or more parameters are associated with the vehicle and a driving environment. The method also includes notifying the driver that the maneuver was unnecessary using a notification signal if the one or more parameters satisfy the threshold.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the training of a driver about vehicle takeovers according to parameters used to derive a reliability model associated with a vehicle operating in automated driving system (ADS) mode are disclosed herein. A training system gives feedback about a driver's maneuver after takeover according to parameters of the reliability model for the driver to learn when takeovers from ADS mode are most needed. The reliability model may be derived, for example, from map data and other parameters associated with a surrounding environment of the vehicle, existing obstacles on the road, an experience level of the driver in ADS mode, or the like that are weighted or combined. The training system utilizes the reliability model to determine the confidence of an automated motion plan being valid in comparison to the driver's maneuver after takeover. The parameters may be based on the vehicle operating in or out of ADS mode. ADS mode may refer to, for example, navigating and/or maneuvering the vehicle along a travel route using a computing system(s) to control the vehicle with minimal or no input from a human driver.

Furthermore, a message may notify the driver that the vehicle takeover by the driver was necessary or unnecessary according to the map data and other parameter values of the reliability model satisfying a threshold. For example, map data may indicate that a stretch of road is known for animal crossings making an automated motion plan less reliable in a motion model. In one approach, a threshold may be, for example, a parameter or value that is equal to, greater than, or less than a measurement of the parameters of the reliability model. The vehicle takeover by the driver while a vehicle operates in ADS mode may be unnecessary if the autonomous driving module(s) could have controlled the vehicle at least as well as the driver for a particular driving maneuver. The feedback by the training system may avoid future takeovers from ADS mode by showing the driver satisfactory vehicle maneuvers by the ADS.

Furthermore, the training system may improve driver training about ADS reliability, ADS capabilities, ADS improvements, ADS updates, ADS safety features, or the like. Parameters of a reliability model are utilized by the training system to determine the necessity of a takeover of a vehicle by the driver in ADS mode. For example, parameters for the training system may be related to measurements of the surrounding physical environment of the vehicle, a vehicle position on a road, an N number of obstacles on the road, a position of a number of obstacles, a vehicle driving state, an experience level of the driver in ADS mode, a distance to physical boundaries, or the like. One or more of the reliability model parameters may be weighted, turned into ratios, derived from other factors, summed, multiplied, or the like as inputs to calculate the reliability model by the training system. The training system may calculate the reliability model in real-time while driving on the road or offline.

In addition, an automated motion plan may be valid when measurements related to parameters used to derive the reliability model satisfy a threshold. If the reliability model does satisfy a threshold, the training system may determine that the vehicle takeover and the maneuver by the driver were unnecessary and notifies the driver. In this way, the system improves training a driver of the necessity of vehicle takeovers to improve confidence, trust, and understanding of ADS operation for more reliable automated driving.

Figure 1:
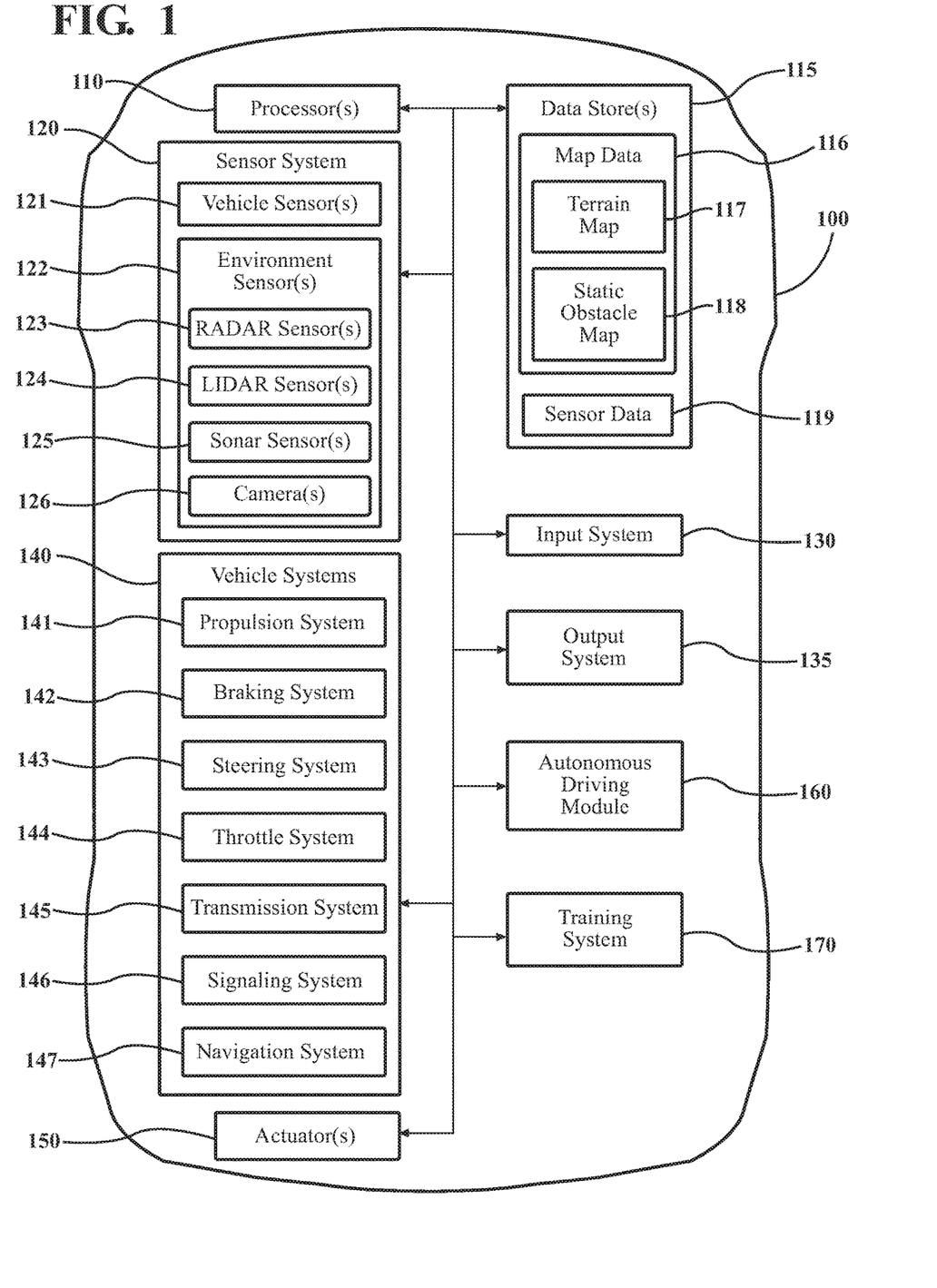
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with a training system for teaching a driver about the necessity of vehicle takeovers while the vehicle 100 operates in ADS mode. As further described herein, an ADS may comprise the autonomous driving module(s) 160, the parts of sensor system 120, the parts of vehicle systems 140, the actuators 150, and the data store(s) 115 that operate together to autonomously drive and control the vehicle 100 in ADS mode.

The vehicle 100 also includes various elements. It will be understood that in various embodiments, the vehicle 100 having all of the elements shown in FIG. 1 may be unnecessary. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a training system 170 that is implemented to perform methods and other functions as disclosed herein relating to improving the training of a driver for vehicle takeovers while the vehicle operates in ADS mode.

Figure 2:
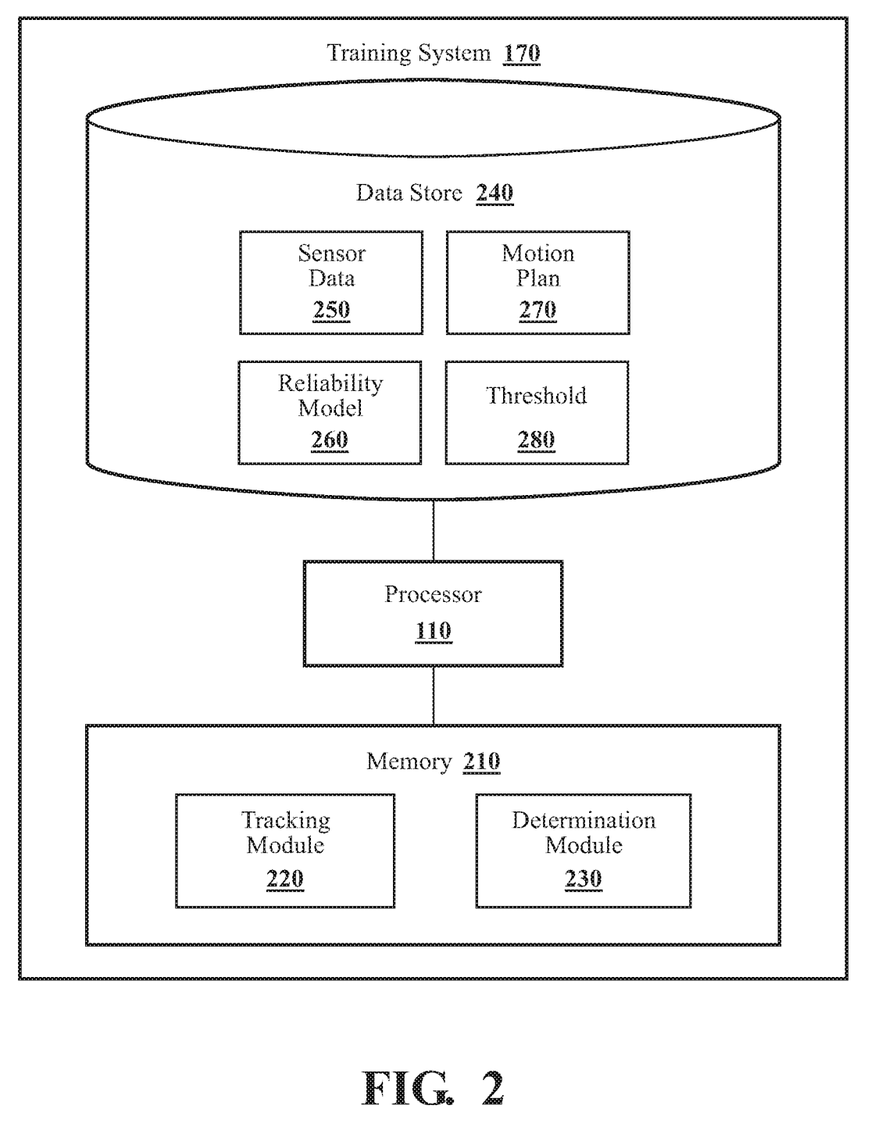
FIG. 2 illustrates one embodiment of a training system for training a driver for vehicle takeovers by the driver in association with the automated driving system (ADS) capabilities and a reliability model associated with the vehicle in FIG. 1.

FIG. 2 illustrates one embodiment of a training system for training a driver for on-road vehicle takeovers by the driver in association with the ADS capabilities and the reliability model associated with the vehicle in FIG. 1. The training system 170 is shown as including a processor 110 from the vehicle 100 of FIG. 1. Accordingly, the processor 110 may be a part of the training system 170, the training system 170 may include a separate processor from the processor 110 of the vehicle 100, or the training system 170 may access the processor 110 through a data bus or another communication path. In one embodiment, the training system 170 includes a memory 210 that stores a tracking module 220 and a determination module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The training system 170 as illustrated in FIG. 2 is generally an abstracted form. The tracking module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the tracking module 220, in one embodiment, acquires sensor data 250 that includes at least camera images. In further arrangements, the tracking module 220 acquires the sensor data 250 from further sensors such as radar, light detection and ranging (LiDAR), and other sensors as may be suitable for identifying vehicles and locations of the vehicles.

Accordingly, the tracking module 220, in one embodiment, controls the respective sensors (e.g., inertial measurement unit (IMU), input sensors, etc.) to provide the data inputs in the form of the sensor data 250. Additionally, while the tracking module 220 is discussed as controlling the various sensors to provide the sensor data 250, in one or more embodiments, the tracking module 220 can employ other techniques to acquire the sensor data 250 that are either active or passive. For example, the tracking module 220 can passively sniff the sensor data 250 from a stream of electronic information provided by the various sensors to further components within the vehicle 100. Moreover, the tracking module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 250 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

Of course, depending on the sensors that the vehicle 100 includes, the available information that the training system 170 can harvest as the sensor data 250 may vary. As one example, according to a particular implementation, the vehicle 100 may include different versions of an IMU sensor that are separately capable of different measurements. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the modules 220 or 230 may, in one or more approaches, be configured to adapt to different electronic inputs depending on the availability of such information. As an additional note, telematics data as used herein generally encompasses the sensor data 250 and may include further information such as vehicle identifiers, location information (e.g., GPS position), and other information that may be used by the training system 170 to determine travel paths or plans for vehicle 100 by the autonomous driving module(s) 160.

General observations of the surrounding environment include various obstacles detected by, for example, the sensor system 120 and stored in sensor data 250. For example, the sensor data 250 may include information about lane markings, traffic signs, side-walks, or the like. Moreover, the tracking module 220, in one embodiment, controls the sensors to acquire the sensor data 250 about an area that encompasses 360 degrees about the vehicle 100 in order to provide a comprehensive assessment of the surrounding environment. Of course, in alternative embodiments, the tracking module 220 may acquire the sensor data about a forward direction alone when, for example, the vehicle 100 is not equipped with further sensors to include additional regions about the vehicle and/or the additional regions are not scanned due to other reasons.

Moreover, in one embodiment, the training system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250.

In one embodiment, the data store 240 also includes the reliability model 260, the motion plan 270, and the threshold 280. In association with vehicle takeover by the driver, the autonomous driving module(s) 160 may derive motion plans as if the ADS were controlling the vehicle instead of the driver after the takeover. The automated motion plan may be generated or derived using sensor data 250 to determine a suitable maneuver for the driving environment. Training system 170 determines if a motion plan 270 by the ADS or autonomous driving module(s) 160 of the vehicle is valid by using a reliability model. The automated or projected motion plan 270 may be valid if one or more parameters, associated with the vehicle and driving environment, of the reliability model 260 satisfy a threshold. The reliability model 260 may be based on or derived from map data of the surrounding environment and other parameters associated with the vehicle 100, driver, or driving environment factors while operating in or out of ADS mode. For example, map data may indicate that a stretch of road is known for poor GPS coverage making an automated motion plan less reliable in a model. Also, parameters for the training system may be related to the surrounding physical environment of the vehicle, a vehicle position on a road, an N number of obstacles on the road, a position of a number of obstacles, obstacle types, a vehicle driving state, an experience level of the driver in ADS mode, a distance to physical boundaries, road markings, map information, hazard map data, or the like. Thus, parameters of the reliability model 260 may determine when a vehicle maneuver by a driver after the takeover is valid.

Continuing with FIG. 2 and the manner in which the training system 170 implements the driver training, the tracking module 220 may be configured to perform additional tasks beyond controlling the respective sensors in the training system 170 to acquire and provide the sensor data 250. For example, the tracking module 220 may generate, in association with a maneuver by the driver that is a vehicle takeover, the motion plan 270 associated with the driver's maneuver. Furthermore, the determination module 230, in one embodiment, is further configured to perform additional tasks beyond using the respective sensors. For example, the determination module 230 determines if the motion plan 270 is valid when map data of the surrounding environment and one or more other parameters, associated with the vehicle and driving environment, used to derive the reliability model 260 satisfy a threshold 280. The threshold 280 can be, for example, a parameter or value that is equal to, greater than, or less than a measurement of the one or more parameters of the reliability model 260.

In addition, tracking module 220 or determination module 230 may also use a machine learning algorithm to determine the motion plan 270 associated with the driver's maneuver. For example, a convolutional neural network (CNN) may perform semantic segmentation over the sensor data 250 to derive the motion plan 270. Of course, in further examples, the tracking module 220 or determination module 230 employs different machine learning algorithms or implements different approaches for performing the associated functions.

In the forthcoming examples, the tracking module 220 and determination module 230 of the training system 170 may utilize the sensor data 250, the reliability model 260, the motion plan 270, and/or the threshold 280 stored in the data store 240 to train a driver about the necessity of a vehicle takeover by a driver. In particular, the tracking module 220 may use, for example, the sensor data 250 to generate the motion plan 270 in association with a maneuver by the driver that is a vehicle takeover. The determination module 230 subsequently analyzes the necessity of the takeover or driver actions using map data of the surrounding environment and other parameters to derive a reliability model 260. For example, if the training system 170 determines that a parameter of a reliability model 260 is not satisfied, the driver is notified that the vehicle takeover was necessary. The notification may be a notification signal or message such as haptic feedback to the driver, haptic feedback on the steering wheel, haptic feedback on the driver's seat, a displayed message, or the like. Accordingly, notifying the driver of a necessary or unnecessary takeover immediately after a driving event can teach a driver the types or controls and actions needed for different driving events. As a result, the training system 170 teaches the driver of the necessity for the takeover to improve understanding of ADS capabilities and reliability.

Figure 3:
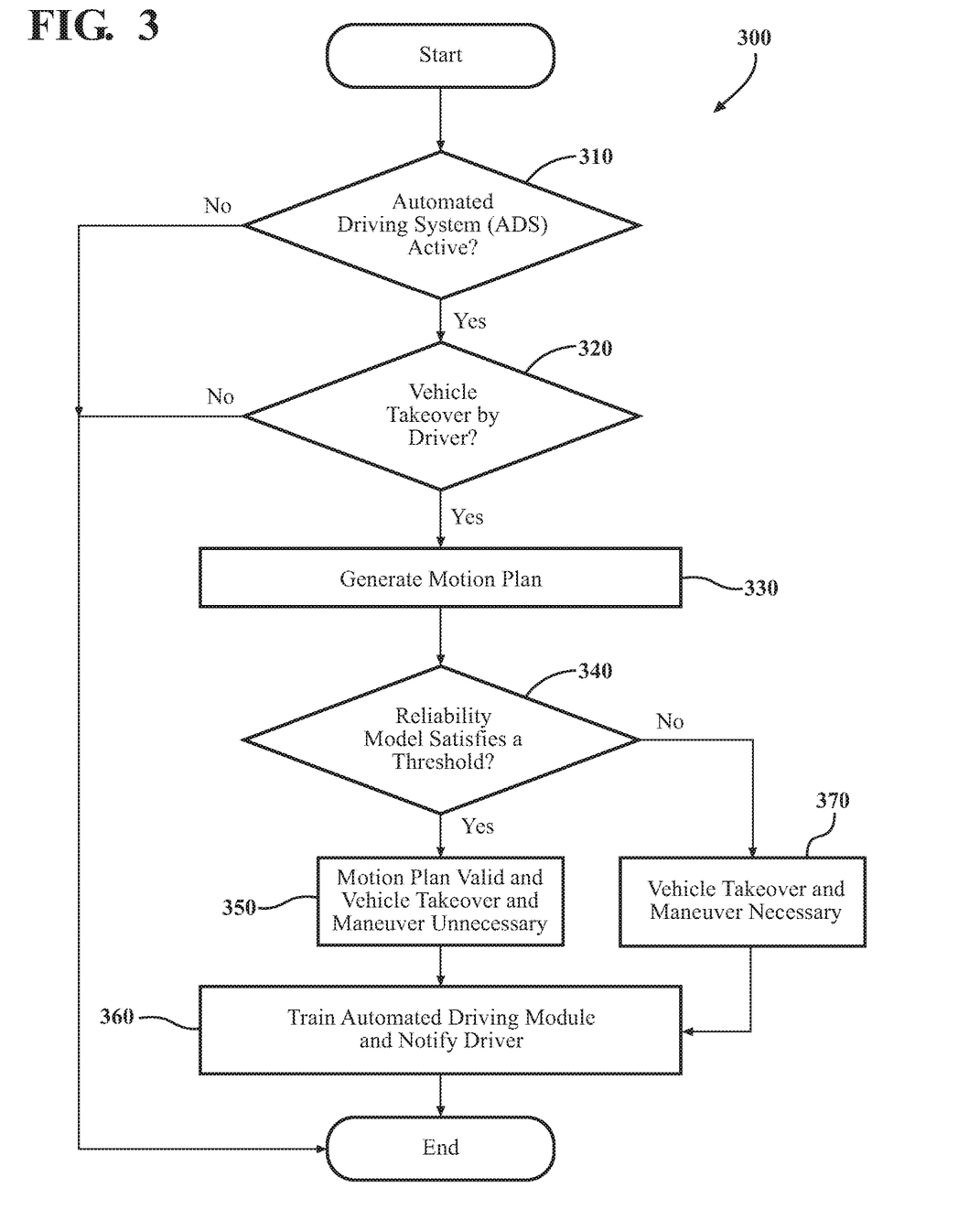
FIG. 3 illustrates one embodiment of a method that is associated with training a driver for vehicle takeovers in association with ADS capabilities and a reliability model.

FIG. 3 illustrates one embodiment of a method that is associated with training a driver for vehicle takeovers in association with ADS capabilities and a reliability model. Method 300 will be discussed from the perspective of the training system 170 of FIGS. 1 and 2. While method 300 is discussed in combination with the training system 170, it should be appreciated that the method 300 is not limited to being implemented within the training system 170 but is instead one example of a system that may implement the method 300.

As a brief introduction to the method 300, prior to the discussion of the explicitly identified functions, during active ADS mode, the training system 170 determines if a vehicle takeover or intervention by a driver is necessary or unnecessary. The driver of a vehicle may prematurely take over the vehicle 100 due to dissatisfaction, disaffection, safety concerns, or the like. The necessity is determined, such as by tracking module 220 and determination module 230, by analyzing a maneuver by a driver, such steering to avoid another vehicle, to determine the validity of a projected motion plan 270. For example, if the training system 170 determines that map data of the surrounding environment and values one or more other parameters of the reliability model 260 satisfy the threshold 280, the motion plan 270 may be valid and the vehicle takeover by the driver was unnecessary. The autonomous driving module(s) 160 is subsequently trained to improve motion control for the driving event. The autonomous driving module(s) 160 training may prevent unnecessary driver takeover while vehicle 100 operates in ADS mode.

The driver is notified of the unnecessary maneuver by the training system 170 for driver training. Alternatively, if map data of the surrounding environment and values of one or more other parameters of the reliability model 260 do not satisfy the threshold 280, the driver is notified that the maneuver was necessary. The feedback for a necessary driver action teaches the driver about ADS reliability to improve driver control.

Figure 4:
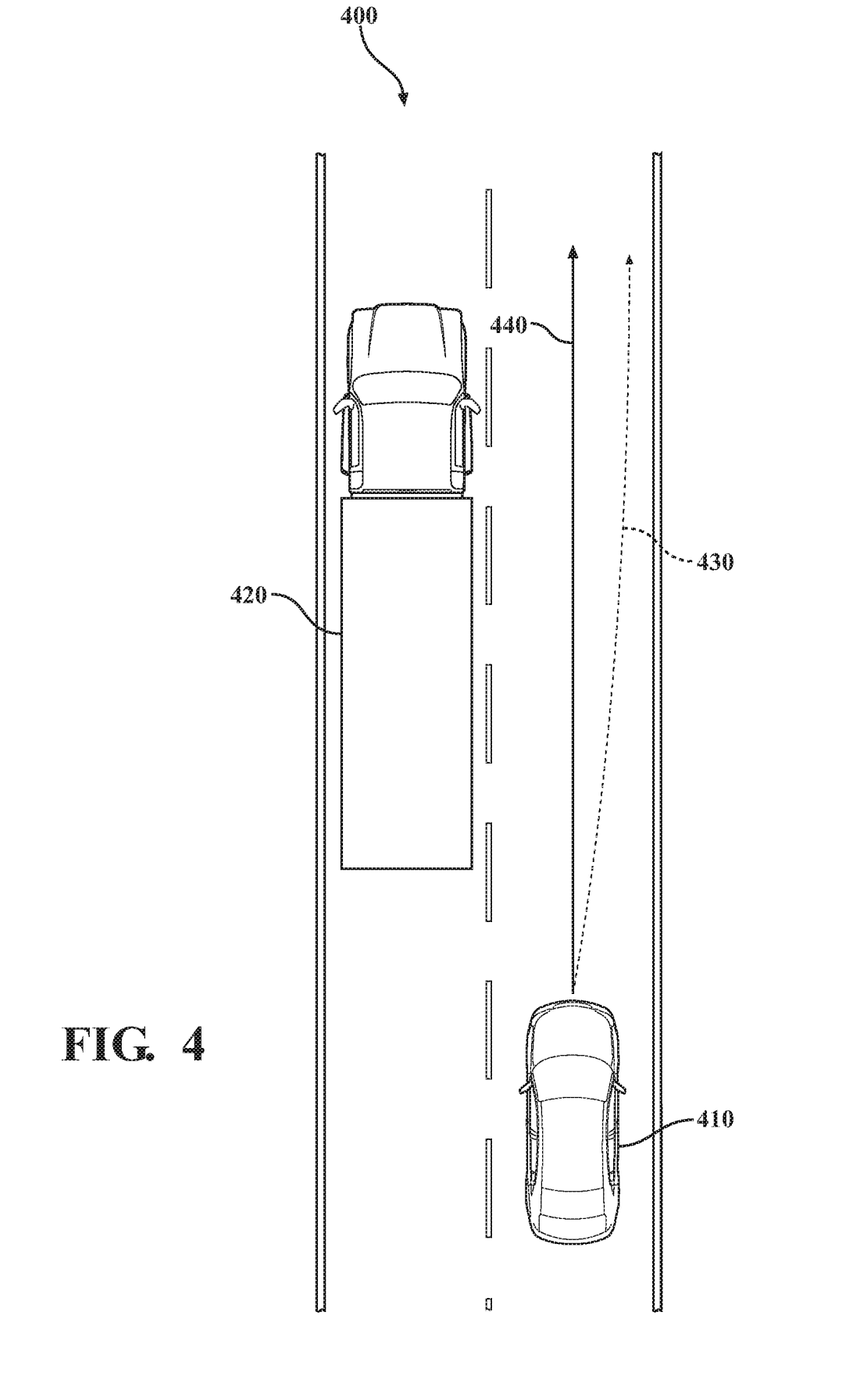
FIG. 4 is a diagram illustrating one example of a scenario for training a driver for vehicle takeovers by observing driver and ADS maneuvers.

As an example of a driver maneuver after takeover and an automated motion plan, FIG. 4 illustrates one example of a scenario for training a driver for vehicle takeovers by observing driver and ADS maneuvers 400. In a driving environment, vehicle 410 may travel in the right lane in active ADS mode while truck 420 travels in the left lane on the road. Due to dissatisfaction, disaffection, or safety concerns, the driver of vehicle 410 may prematurely take over the vehicle to steer right of the center lane path 440 to the desired path 430, to keep a distance from truck 420. Assuming map data of the surrounding environment and values one or more other parameters used to derive the reliability model 260 meet the threshold 280, the maneuver by the driver of vehicle 410 is taken before allowing the autonomous driving module(s) 160 to steer to the desired path 430. In this example, the take over by the driver is redundant or unnecessary since the autonomous driving module(s) 160 was also going to steer the vehicle to approximately the desired path 430.

In one embodiment, due to dissatisfaction, disaffection, or safety concerns, the driver of the vehicle 410 may also prematurely take over from ADS mode operation and hit the brakes to slow down because of potential danger to the truck 420. Again, assuming that map data of the surrounding environment and values one or more other parameters of the reliability model 260 meet the threshold 280, the maneuver by the driver for vehicle 410 is taken before allowing the autonomous driving module(s) 160 to slow down or decelerate. In this example, the take over by the driver is redundant or unnecessary since the autonomous driving module(s) 160 was also going to brake the vehicle 410 to decelerate.

Referring again to determining unnecessary takeovers in FIG. 3, at 310 in method 300 if the ADS is active, the training system 170 waits until a vehicle takeover is performed by a driver. Vehicle 100 may be operating in an active ADS mode when, for example, the autonomous driving module(s) 160 navigates and/or maneuvers the vehicle 100 along a travel route with minimal human driver commands. In particular, the navigation or maneuver of vehicle 100 may be performed by the autonomous driving module(s) 160 using a computing system(s) to control the vehicle 100 with minimal or no input from a human driver.

At 320, a driver may take over a vehicle because of, for example, the dissatisfaction of the automated driving or an imminent safety concern. For example, the driver may perceive from the path or speed of the vehicle 100 that a dangerous event is imminent while operating in ADS mode. As illustrated in FIG. 4, a driver may prematurely take over the vehicle 410 to steer right of the center lane path 440 to the desired path 430, to keep a distance from truck 420. Thus, the driver takes over due to safety, lack of confidence, lack of trust, or the like of the autonomous driving module(s) 160 to control the vehicle 100 to avoid the collision.

At 330, the tracking module 220 may generate, in association with a maneuver by the driver that is a vehicle takeover, an automated motion plan associated with the maneuver. A maneuver, for example, may be a lane change, swerving, sudden braking, or the like. The training system 170 may determine if the motion plan 270 is valid on a condition that map data of the surrounding environment and values one or more other parameters used to derive the reliability model 260 satisfy the threshold 280. Satisfying a threshold may be determined according to parameter values or levels related to measurements of the surrounding physical environment of the vehicle, a vehicle position on a road, an N number of obstacles on the road, obstacle types, a position of a number of obstacles, a vehicle driving state, an experience level of a driver in ADS mode, a distance to physical boundaries, road markings, map information, hazard map data, or the like. The threshold 280 can be, for example, a parameter or value that is equal to, greater than, or less than a measurement of the one or more parameters of the reliability model 260.

At 340, the determination module 230 may analyze the map data of the surrounding environment and values one or more other parameters of the reliability model 260 to determine satisfaction of the threshold 280. The training system 170 uses the analysis results to determine the validity of the motion plan 270. In one embodiment, an automated motion plan associated with the maneuver is valid according to a disparity between factors of the maneuver by the driver to the map data of the surrounding environment and measured values of one or more other parameters of the reliability model. By using a reliability model with a comprehensive set of parameters for the prediction and validity of an automated motion plan, the necessity of vehicle takeover by a driver is determined by the training system 170 more effectively and safely.

At 350, the determination module 230 may determine that the maneuver by the driver to take over control of the vehicle was unnecessary if the map data of the surrounding environment and the one or more parameters of the reliability model satisfy the threshold 280. For example, a comparison to the map data parameters of the surrounding environment may indicate that an automated motion plan generated by tracking module 220 in an urban driving environment is satisfactory or better than the maneuver by the driver.

At 370, the determination module 230 may determine that the maneuver by the driver to take over control of the vehicle was necessary if the map data of the surrounding environment and values and the one or more other parameters of the reliability model do not satisfy the threshold 280. At 360, the autonomous driving module(s) 160 is trained to improve motion control for the driving event so that takeover may be prevented by the driver for different driving environments. The driver is notified of the necessary maneuver for driver training of vehicle takeovers. The notification may be a notification signal or message such as haptic feedback to the driver, haptic feedback on the steering wheel, haptic feedback on the driver's seat, a displayed message, or the like.

Again referring to 360, as a result of unnecessary or necessary driver takeover determined by the determination module 230 according to parameters of the reliability model 260, the autonomous driving module(s) 160 is trained by training system 170 to improve motion control for a maneuver so that takeover may be prevented by the driver. For example, the autonomous driving module(s) 160 may adjust the coefficient of acceleration, slip parameters, distance margin parameters to objects, behavior models, or the like. The training system 170 adjusting and storing driving related parameters may improve automated motion plans and ADS mode. The driver is notified of the unnecessary maneuver by the training system 170 for driver training of vehicle takeovers. With the feedback by the training system 170, the driver behavior may be improved to prevent early or premature takeover next time for a similar driving event.

Figure 5:
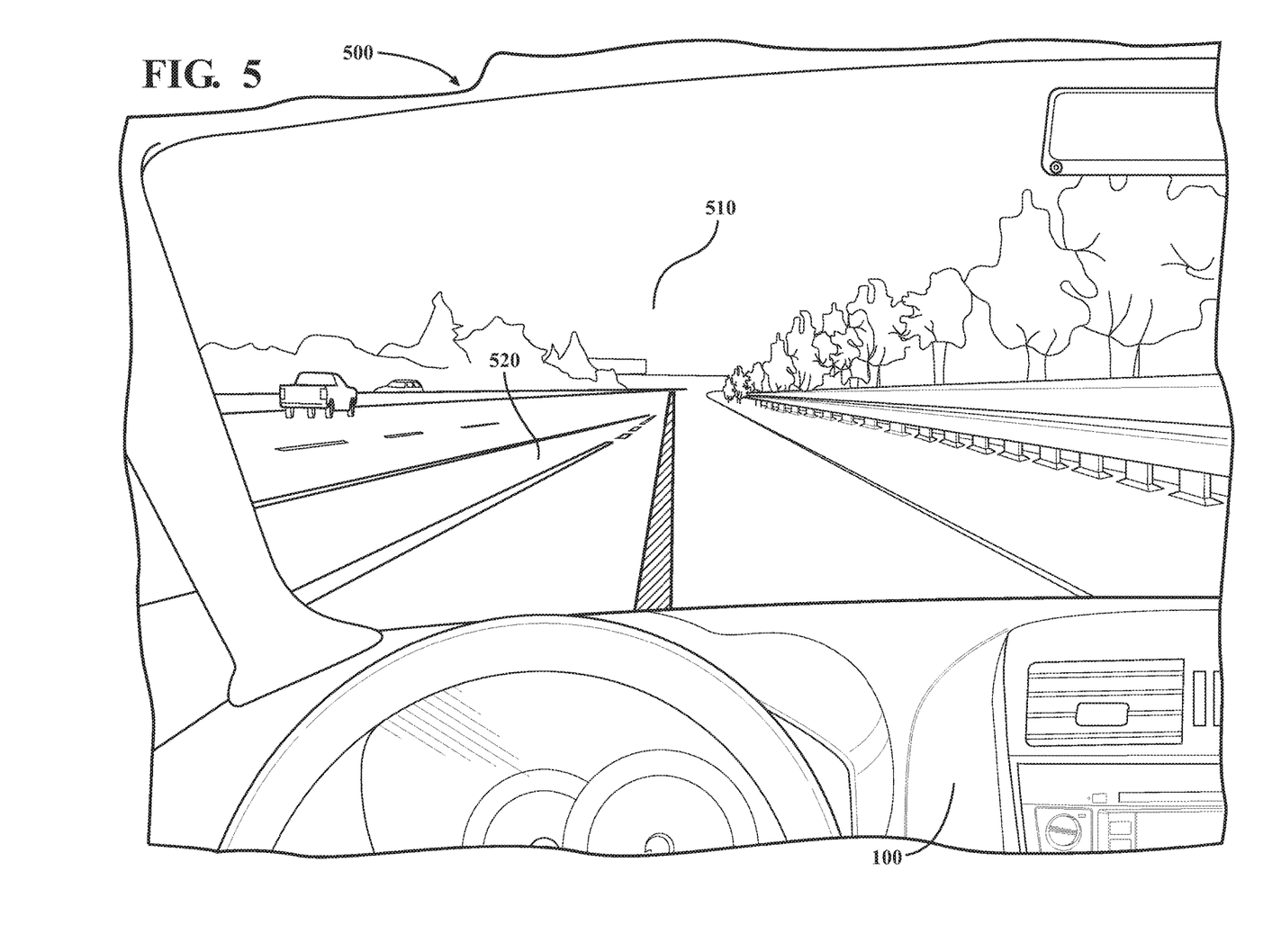
FIG. 5 illustrates a vehicle driving environment where a driver is trained for vehicle takeovers on a road with other vehicles.

FIG. 5 illustrates one embodiment of a vehicle driving environment 500. In FIG. 5, premature takeover by a driver in an expressway driving environment is illustrated. The driving environment 510 may include the vehicle 100 traveling on the expressway 520. Similar to the observing driver and ADS maneuvers in 400, the driver may unnecessarily take over or intervene with ADS mode to avoid a risky path to pass the vehicle in the left lane. The takeover or disengagement may be a result of poor expectations by the driver of the autonomous driving module(s) 160 controlling the vehicle on the expressway 520 for the driving scenario. Using the reliability model based analysis for driver training in method 300 may avoid or prevent the takeover to improve ADS mode performance.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As an autonomous vehicle, vehicle 100 may be configured to use an ADS to perform autonomous functions through the autonomous driving module(s) 160. As used herein, "autonomous vehicle" refers to a vehicle that is capable of operating in an autonomous, automated, or ADS mode (e.g., category 5, full automation). "Autonomous mode" or ADS mode refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect a position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the training system 170, and/or the autonomous driving module(s) 160 can be operatively connected to communicate with the various vehicle systems 140 and/or individual components thereof. For example, the processor(s) 110 and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140 and, thus, may be partially or fully autonomous as defined by the Society of Automotive Engineers (SAE) 0 to 5 levels.

As another example, the processor(s) 110, the training system 170, and/or the autonomous driving module(s) 160 can be operatively connected to communicate with the various vehicle systems 140 and/or individual components thereof. For example, the processor(s) 110, the training system 170, and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140.

The processor(s) 110, the training system 170, and/or the autonomous driving module(s) 160 may be operable to control the navigation and maneuvering of the vehicle 100 by controlling one or more of the vehicle systems 140 and/or components thereof. For instance, when operating in an automated or autonomous mode, the processor(s) 110, the training system 170, and/or the autonomous driving module(s) 160 can control the direction and/or speed of the vehicle 100. The processor(s) 110, the training system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components responsive to receiving signals or other inputs from the processor(s) 110 and/or the autonomous driving module(s) 160. For instance, the one or more actuators 150 can include motors, pneumatic actuators, hydraulic pistons, relays, solenoids, piezoelectric actuators, or the like.

The vehicle 100 can include one or more modules, at least some of which are described herein. The modules can be implemented as computer-readable program code that, when executed by the processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the training system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by an occupancy module. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, reversing, or the like. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A training system for improving training of a driver during an automated driving system mode, comprising:
   one or more processors;
   a memory communicably coupled to the one or more processors and storing:
      a tracking module including instructions that when executed by the one or more processors cause the one or more processors to generate, in association with a maneuver by the driver associated with a takeover of a vehicle, an automated motion plan associated with the maneuver;
      a determination module including instructions that when executed by the one or more processors cause the one or more processors to:
         determine if the automated motion plan is valid based, at least in part, on a condition that one or more parameters of a reliability model satisfy a threshold, wherein the one or more parameters are associated with the vehicle and a driving environment; and
         notify the driver about the validity of the maneuver using a notification signal if the one or more parameters satisfy the threshold.

2. The training system of claim 1, the determination module further including instructions to determine that the automated motion plan in association with the maneuver associated with the takeover is valid according to a disparity between the maneuver by the driver and a weight of the one or more parameters and map data of a surrounding environment of the reliability model.

3. The training system of claim 1, wherein the determination module further includes instructions that when executed by the one or more processors cause the one or more processors to derive the reliability model by weighting and combining the one or more parameters and wherein the one or more parameters of the reliability model are associated with one or more of map data of a surrounding environment of the vehicle, the surrounding environment of the vehicle, vehicle position on a road, a number of obstacles on the road, a position of a number of obstacles, a vehicle driving state, or distance to physical boundaries near the vehicle.

4. The training system of claim 1, wherein the determination module further includes instructions that when executed by the one or more processors cause the one or more processors to notify the driver that the maneuver by the driver was necessary on a condition that the reliability model does not satisfy the threshold.

5. The training system of claim 1, wherein the determination module further includes instructions that when executed by the one or more processors cause the one or more processors to train an automated driving module according to the maneuver by the driver being unnecessary or necessary.

6. The training system of claim 5, wherein the determination module includes instructions to train the automated driving module according to a disparity between the maneuver by the driver and the one or more parameters of the reliability model.

7. The training system of claim 1, wherein the one or more parameters of the reliability model are associated with an experience level of the driver in the automated driving system mode.

8. A non-transitory computer-readable medium for improving training of a driver during an automated driving system mode and including instructions that when executed by one or more processors cause the one or more processors to:
   generate, in association with a maneuver by the driver associated with a takeover of a vehicle, an automated motion plan associated with the maneuver;
   determine if the automated motion plan is valid based, at least in part, on a condition that one or more parameters of a reliability model satisfy a threshold, wherein the one or more parameters are associated with the vehicle and a driving environment; and
   notify the driver about the validity of the maneuver using a notification signal if the one or more parameters satisfy the threshold.

9. The non-transitory computer-readable medium of claim 8, wherein the instructions to determine further include instructions to determine that the automated motion plan in association with the maneuver associated with the takeover is valid according to a disparity between the maneuver by the driver and a weight of the one or more parameters and map data of a surrounding environment of the reliability model.

10. The non-transitory computer-readable medium of claim 8, wherein the instructions to determine further include instructions to derive the reliability model by weighting and combining the one or more parameters and wherein the one or more parameters of the reliability model are associated with one or more of map data of a surrounding environment of the vehicle, the surrounding environment of the vehicle, vehicle position on a road, a number of obstacles on the road, a position of a number of obstacles, a vehicle driving state, or distance to physical boundaries near the vehicle.

11. The non-transitory computer-readable medium of claim 8, wherein the instructions to determine further include instructions to notify the driver that the maneuver by the driver was necessary on a condition that the reliability model does not satisfy the threshold.

12. The non-transitory computer-readable medium of claim 8, wherein the instructions to determine further include instructions to train an automated driving module according to the maneuver by the driver being unnecessary or necessary.

13. The non-transitory computer-readable medium of claim 8, wherein the instructions include the one or more parameters of the reliability model that are associated with an experience level of the driver in the automated driving system mode.

14. A method for improving training of a driver during an automated driving system mode, the method comprising:
generating, in association with a maneuver by the driver associated with a takeover of a vehicle, an automated motion plan associated with the maneuver;
determining if the automated motion plan is valid based, at least in part, on a condition that one or more parameters of a reliability model satisfy a threshold, wherein the one or more parameters are associated with the vehicle and a driving environment; and
notifying the driver about the validity of the maneuver using a notification signal if the one or more parameters satisfy the threshold.

15. The method of claim 14 further comprising determining that the automated motion plan associated in association with the maneuver associated with the takeover is valid according to a disparity between the maneuver by the driver and a weight of the one or more parameters and map data of a surrounding environment of the reliability model.

16. The method of claim 14 further comprising determining the reliability model by weighting and combining the one or more parameters to derive the reliability model and wherein the one or more parameters of the reliability model are associated with one or more of map data of a surrounding environment of the vehicle, the surrounding environment of the vehicle, vehicle position on a road, a number of obstacles on the road, a position of a number of obstacles, a vehicle driving state, or distance to physical boundaries near the vehicle.

17. The method of claim 14 further comprising notifying the driver that the maneuver by the driver was necessary on a condition that the reliability model does not satisfy the threshold.

18. The method of claim 14 further comprising training an automated driving module according to the maneuver by the driver being unnecessary or necessary.

19. The method of claim 18, wherein the automated driving module is trained according to a disparity between the maneuver by the driver and the one or more parameters of the reliability model.

20. The method of claim 14, wherein the one or more parameters of the reliability model are associated with an experience level of the driver in the automated driving system mode.

* * * * *

UNITED STATES PATENT AND TRADEMARK OFFICE
CERTIFICATE OF CORRECTION

PATENT NO. : 11,763,694 B2
APPLICATION NO. : 16/935486
DATED : September 19, 2023
INVENTOR(S) : Hiromitsu Urano, Kentaro Ichikawa and Junya Ueno It is certified that error appears in the above-identified patent and that said Letters Patent is hereby corrected as shown below:

In the Claims

Claim 15, Column 20, Line 2, delete "plan associated in association" and insert --plan in association--.

Signed and Sealed this
Twenty-fourth Day of October, 2023

Katherine Kelly Vidal
*Director of the United States Patent and Trademark Office*